United States Patent [19]

Uemura et al.

[11] Patent Number: 5,179,138
[45] Date of Patent: Jan. 12, 1993

[54] PROCESS FOR PRODUCING A VINYL CHLORIDE RESIN COMPOSITION FOR POWDER MOLDING

[75] Inventors: Katsuoki Uemura; Masaru Ando, both of Ichiharashi, Japan

[73] Assignee: Chisso Corporation, Osaka, Japan

[21] Appl. No.: 769,574

[22] Filed: Oct. 2, 1991

Related U.S. Application Data

[63] Continuation of Ser. No. 590,587, Sep. 27, 1990, abandoned, which is a continuation of Ser. No. 490,505, Mar. 1, 1990, abandoned, which is a continuation of Ser. No. 214,469, Jul. 1, 1988, abandoned.

[30] Foreign Application Priority Data

Jan. 25, 1988 [JP] Japan ................................ 63-14061

[51] Int. Cl.$^5$ .............................................. C08K 3/02
[52] U.S. Cl. ..................................... 523/330; 524/569
[58] Field of Search ........................ 523/330; 524/569; 526/66

[56] References Cited

U.S. PATENT DOCUMENTS 4,632,948 12/1986 Yamada et al. ...................... 523/219

FOREIGN PATENT DOCUMENTS

| 231588 | 9/1958 | Australia ............................ 523/130 |
| 0023963 | 2/1981 | European Pat. Off. . |
| 1193016 | 12/1960 | Fed. Rep. of Germany . |
| 1454878 | 4/1962 | Fed. Rep. of Germany . |
| 59-161456 | 9/1984 | Japan . |
| 653965 | 7/1948 | United Kingdom ................ 523/130 |
| 939821 | 3/1961 | United Kingdom . |
| 982506 | 8/1963 | United Kingdom . |

Primary Examiner—Joseph L. Schofer
Assistant Examiner—Peter D. Mulcahy
Attorney, Agent, or Firm—Leydig, Voit & Mayer

[57] ABSTRACT

A process which produces a vinyl chloride resin composition for powder molding by mixing a vinyl chloride resin, a plasticizer and at least one vinyl chloride resin modifying additive in a mixer is provided, which process includes the following steps (A), (B), and (C): (A) feeding a powdery vinyl chloride resin, a plasticizer and at least one vinyl chloride resin modifying additive to a high-speed agitating mixer provided with agitating elements, a jacket, a gas-inlet port and a gas-outlet port and mixing these materials with stirring while heating them to 120° C. to 130° C.; (B) cooling the resulting materials in a mixer down to 70° C. or lower; and (C) further adding thereto a vinyl chloride emulsion polymer and mixing the resulting materials with stirring at 70° C. or lower. In the process, a gas is blown into the mixer in either both of steps (A) and (B) or all of the steps (A), (B) and (C), while mixing the contents in the mixer with stirring and blowing a gas into the mixer from the gas-inlet port and discharging the gas from the gas-outlet port, a circular motion being imparted by the agitating elements and the gas blown-in resulting in a floating motion to the contents in the mixer, and the rate of blowing the gas into the mixer being in the range of from 1 to 1,000 nl/min. per l of capacity of the mixer and the pressure of the gas blown thereinto being in the range of 0.005 to 2 kg/cm$^2$G. per l of capacity of the mixer.

11 Claims, 1 Drawing Sheet

PROCESS FOR PRODUCING A VINYL CHLORIDE RESIN COMPOSITION FOR POWDER MOLDING

This application is a continuation of application Ser. No. 07/590,587, filed on Sep. 27, 1990, now abandoned entitled PROCESS FOR PRODUCING A VINYL CHLORIDE RESIN COMPOSITION FOR POWDER MOLDING, which is a continuation of Ser. No. 07/490,505 filed on Mar. 1, 1990, now abandoned, which is a continuation of Ser. No. 07/214,469, filed on Jul. 1, 1988, now abandoned.

BACKGROUND OF THE INVENTION

1. Field of the Invention

This invention relates to a process for producing a vinyl chloride resin composition for powder molding. More particularly it relates to a process for producing a vinyl chloride resin composition for powder molding, which process, even in the case of powder molding using a mold having a complicated shape and a pattern of fine projections and depressions, affords a molded product faithfully duplicating the shape and the pattern and also having a uniform thickness.

2. Description of the Related Art

Recently, various molding processes and coating processes such as rotational molding processes, slush molding processes, fluidized bed dip coating processes, electrostatic coating processes, etc. (these molding processes and coating processes hereinafter being collectively referred to as powder molding processes) using powdery thermoplastic resin compositions have been broadly employed. Further, powdery vinyl chloride resin compositions have also been used for the powder molding.

Heretofore, as a process for producing powdery vinyl chloride resin compositions for powder molding (hereinafter referred to as powdery PVC compositions), there has generally been carried out a process wherein a powdery vinyl chloride resin, a plasticizer and various necessary additives, each in a definite quantity were introduced into a high-speed agitating mixer such as Henschel mixer (tradename), super mixer, etc. provided with a jacket for heating and cooling, followed by raising the resin temperature inside the mixer to about 130° C. with stirring by passing hot water or steam through the inside of the jacket, to have the plasticizer absorbed in the powdery vinyl chloride resin, cooling the resin temperature inside the mixer down to about room temperature by passing cooling water through the inside of the jacket, then adding a definite quantity of a vinyl chloride emulsion polymer (hereinafter referred to as emulsion polymer) to the mixture inside in the mixer in order to improve the powder flowability, again agitating the mixture in the vicinity of room termperature to coat the surface of the powdery vinyl chloride resin with the emulsion polymer and taking out the resulting material to obtain a powdery PVC composition.

One of properties required for the powdery PVC composition for powder molding consists in the respective particles of the powdery PVC composition being present in discrete manner without adhering or agglomerating to one another and abundant in the powder flowability. If the agglomeration of the particles is notable, the powder flowability becomes inferior, and if such a powdery PVC composition is used, it is impossible in the powder molding using a mold having a complicated shape and a pattern of fine projections and depressions to obtain a molded product faithfully duplicating the shape and the pattern of the mold surface and having a uniform thickness, and moreover if such a powdery PVC composition is stored, the powder particles often adhere tightly to one another in a lump to lose the powder flowability and thereby be unable to use the composition for powder molding.

Thus, the powdery PVC composition obtained according to a conventional production process is still unsatisfactory in the aspect of powder flowability.

The present inventors have made extensive research on a process for producing a powdery PVC composition having improved the powder flowability. As a result, we have found that the adhesion and agglomeration of the particles among one another deteriorating the powder flowability are caused by fine particles (average particle size: $100\mu$ or less) present in the powdery PVC composition; hence by reducing the quantity of such fine particles present, the powder flowability of the resulting powdery PVC composition is notably improved, and have achieved the present invention.

SUMMARY OF THE INVENTION

As apparent from the foregoing, the object of the present invention is to provide a process for producing a vinyl chloride resin composition suitable for powder molding and having a superior powder flowability The present invention resides in a process for producing a vinyl chloride resin composition for powder molding comprising mixing a vinyl chloride resin, a plasticizer and additive(s) in a mixer with stirring while blowing a gas into said mixer.

DETAILED DESCRIPTION OF PREFERRED EMBODIMENTS

Figure 1:
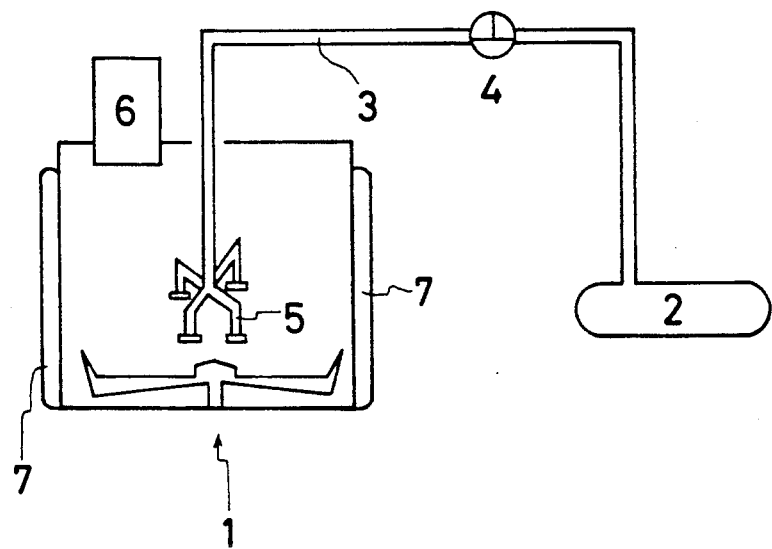
FIG. 1 shows a schematic view illustrating the production line of the present invention wherein numeral 1: 20 l capacity Henschel mixer (tradename), 2: compressor, 3: gas-introducing pipe, 4: regulator, 5: gas-blowing-in port, 6: gas-discharging port and dust collector, and 7: jacket for heating and cooling.

The mixing means used in the production process of the present invention, as illustrated in FIG. 1, is an agitating mixer provided with a jacket for heating and cooling and also has a gas-blowing-in or gas-inlet port and a gas-discharging or gas-outlet port. A mixing means consisting of a high-speed agitating mixer such as a Henschel mixer (tradename), super mixer, etc. provided with the above-mentioned gas-inlet port and a gas-outlet (hereinafter referred to merely as mixer) is preferred. As to the gas-inlet port, it is necessary to provide such in a number of one or more, preferably about 2 to 6 inside the mixer, and the position of the gas-inlet port(s) provided inside the mixer has no particular limitation, but it is preferred to provide the port(s) so that a gas can be blown into the mixer from the central upper part of the mixer just downwardly or so that a gas can be blown starting from the vicinity of the central bottom part of the mixer, then along the bottom part and thereafter upwards along the lateral surface of the mixer.

Examples of the gas used in the present invention are air, nitrogen gas, $CO_2$ gas, helium gas, argon gas, etc., but in view of commercial availability and economy, it is preferred to use air, nitrogen gas or $CO_2$ gas. Further, use of nitrogen gas or $CO_2$ gas has an advantage of preventing the deterioration of the composition due to oxidation. As to the pressure and rate of the gas blown, it is necessary to adjust them depending on the capacity of the mixer used and the quantity of powdery vinyl chloride resin fed and the bulk density thereof. In general, the higher the pressure of the gas blown or the larger the rate thereof blown, the better the floating of the powdery vinyl chloride resin inside the mixer, but if the pressure thereof blown is too high or the rate thereof blown is too large, a balance between the rotary motion of the powdery vinyl chloride resin brought about by the agitating blades inside the mixer and the floating motion of the resin brought about by the blown-in gas becomes inferior, making it impossible to effect a good spiral flowing motion, and moreover the heating rate at which the inside of the mixer is heated is reduced, making the operating efficiency inferior. Further, to the contrary, if the pressure thereof blown is too low or the quantity thereof blown is too small, the floating motion inside the mixer does not occur, but only a mere rotary motion by means of agitating blades results. In general, when the number of revolutions of the agitating blades of the mixer is 1,000 rpm and the powdery vinyl chloride resin is fed in a quantity of 0.5 l per l of the capacity of the mixer, the pressure of the gas blown per l of the capacity of the mixer is in the range of 0.005 to 2 $Kg/cm^2G$, preferably 0.1 to 0.8 $Kg/cm^2G$ and the quantity thereof blown is in the range of 1 to 1,000 nl/min., preferably 5 to 200 nl/min.

According to the production process of the present invention, the above-mentioned mixer provided with a jacket for heating and cooling is provided with gas-inlet ports and a gas-discharging port as illustrated in FIG. 1, followed by introducing powdery vinyl chloride resin and definite quantities of plasticizer and additive such as heat stabilizer, lubricant, pigment, etc. into the mixer, agitating the mixture while passing steam through the inside of the jacket to heat the contents inside the mixer to 130° C., continuing agitation for 10 to 40 minutes, preferably 10 to 30 minutes while keeping the temperature so as not to surpass 130° C. to sufficiently have the plasticizer absorbed in the powdery vinyl chloride resin (these operations being referred to as the first stage). At the heating step of the first stage, it is necessary to prevent the temperature of the contents in the mixer from surpassing 130° C. If the contents are heated above 130° C., the powdery vinyl chloride resin undergoes gelation; hence it is necessary to pay attention to such an excess heating. Whereas if the temperature is low, the absorption rate of the plasticizer is so slow that the operating efficiency is lowered and also a portion of the plasticizer not absorbed in the vinyl chloride resin remains on the surface of the vinyl chloride resin particles to inhibit the powder flowability of the resulting powdery PVC composition. Thus the temperature is preferred to be kept within a range of 115° to 125° C. At this first stage, if the rate of the gas blown is too large, the heating efficiency is notably reduced to make the operating efficiency inferior; hence the rate of the gas blown is preferred to be as small as possible. When the mixing with heating at the first stage has been completed, the contents inside the mixer are rapidly cooled down to 70° C. or lower, preferably 50° C. or lower. This step is referred to as the second stage. As to the mixer used at this second stage, the mixer used at the first stage may be used as it is, or another mixer may be used. Its cooling is carried out by passing cooling water through the inside of the jacket of the mixer. At that time, in order to enhance the cooling efficiency inside the mixer, it is preferred to raise the pressure and rate of the gas blown as much as possible since the cooling time is thereby shortened to improve the operating efficiency. After completion of the cooling operation at the second stage, an emulsion polymer is added to the mixer in a definite quantity (usually 5 to 20 parts by weight of the emulsion polymer based on 100 parts by weight of the powdery vinyl chloride resin), followed by further mixing these with stirring for 2 to 10 minutes to coat the particle surface of the powdery PVC composition inside the mixer with the emulsion polymer. This step is referred to as the third stage. When the particle surface is coated with the emulsion polymer at the third stage, it is necessary to keep the temperature of the contents inside the mixer at 70° C. or lower. If the temperature exceeds 70° C., the plasticizer once absorbed in the powdery vinyl chloride resin exudes out through the clearances between the coated emulsion polymer particles to make the powder flowability of the resulting powdery PVC composition notably inferior. Further, the average particle size of the emulsion polymer is preferred to be $1/10$ or less of the average particle size of the powdery vinyl chloride resin.

In the production process of the present invention, the introduction of gas may be carried out throughout all of the first stage to the third stage, but it is important to carry out the introduction of gas during at least one of the first stage and the second stage. It is preferred to carry out the gas addition particularly at the second stage, in the aspect of the operating efficiency as well as in view of the powder flowability of the resulting powdery PVC composition.

The powdery vinyl chloride resin used in the present invention refers to vinyl chloride homopolymer and vinyl chloride copolymers obtained by copolymerizing vinyl chloride with 40 parts by weight or less, preferably 30 parts by weight or less based on 100 parts by weight of vinyl chloride, of at least one monomer copolymerizable therewith selected from ethylene, propylene, butene-1, pentene-1, vinyl acetate, dialkyl maleates (the alkyl group of which has 1 to 12 carbon atoms), dialkyl fumarates (the alkyl group of which has 1 to 12 carbon atoms), vinyl esters of carboxylic acids such as caproic acid, caprylic acid, benzoic acid, etc., vinylidene chloride, alkyl vinyl ethers (the alkyl group of which has 1 to 16 carbon atoms), etc., in the presence of a polymerization initiator. As to the vinyl chloride homopolymer or copolymers, those having a porous particle structure are preferred for improving the absorptivity of plasticizers and usually those produced according to suspension (co)polymerization process or bulk (co)polymerization process and having an average particle size of 100 to 200 μm are preferable.

The plasticizer used in the production process of the present invention has no particular limitation as far as it is usable for vinyl chloride resins, and examples thereof are dialkyl phthalates, dialkyl adipates, trialkyl trimellitates, dialkyl sebacates, dialkyl azelates, alkylbenzyl phthalates, trialkyl phosphates, alkyl aryl phosphates, the alkyl group of the foregoing compounds having 4 to 13 carbon atoms, polyesters, etc. Concrete examples thereof are di-n-butyl phthalate, di-n-octyl phthalate, di-2-ethylhexyl phthalate (DOP), diisooctyl phthalate, octyl decyl phthalate, diisodecyl phthalate, butyl benzyl phthalate, di-2-ethylhexyl isophthalate, di-2-ethylhexyl adipate (DOA), di-n-decyl adipate, diisodecyl adipate, tri-2-ethylhexyl trimellitate, 2-ethylhexyl azelate, dibutyl sebacate, di-2-ethylhexyl sebacate, tributyl phosphate, tri-2-ethylhexyl phosphate, 2-ethylhexyl diphenyl phosphate, tricresyl phosphate, etc., and these may be used alone or in admixture.

Further, as the additives used in the production process of the present invention, various stabilizers, coloring agents, lubricants, inorganic fillers, secondary plasticizers usually added to vinyl chloride resins may be used within ranges where the powder flowability is not damaged.

The present invention will be described in more detail by way of Examples and Comparative examples, but it should not be construed to be limited thereto.

In addition, the measurement methods employed in Examples and Comparative examples are as follows:

(1) Measurement of Angle of Repose

The powdery composition is dropped through a funnel provided with a damper for measurement of bulk density (JIS-K-6721), followed by filling it in a cylindrical pipe (55 mm in diameter and 50 mm high) located just below the funnel, and then rapidly holding up the pipe vertically so that the powdery composition collapses into a mountainous form. The angle of repose of the mountain is then measured.

(2) Measurement of Dropping Speed

The powdery composition (120 ml) is introduced into a funnel provided with a damper for measurement of bulk density (JIS-K-6721), followed by measuring the time during which the total quantity thereof has dropped from the hopper of the funnel. This time is calculated into a time during which 100 ml of the powdery composition has dropped.

(3) Measurement of Bulk Density

According to JIS-K-6721.

(4) Coating Uniformity of Molded Product

An iron plate (50×100×3.2 mm) having its surface subjected to plating treatment is preheated for 10 minutes in an oven heated to 230° C., followed by rapidly taking out the plate, scattering the powdery composition onto the iron plate, baking the resulting plate for 5 seconds, sweeping off unmelted excess powdery composition, again rapidly returning it to the above oven, further heating it for 2 minutes, completely melting the powdery composition on the iron plate to form a resin coating on the iron plate and stripping off the resin-coating to use it as samples. The respective thicknesses of the samples are subjected to six points of measurement to obtain the average values and the deviation values. The evaluation was carried out by classifying values in terms of the deviation value/the average value into the following 4 stages:

⊙ indicates the case where the values are less than $8 \times 10^{-2}$ mm$^{-1}$.

○ indicates the case where the values are $8 \times 10^{-2}$ to $15 \times 10^{-2}$ mm$^{-1}$.

Δ indicates the case where the values are $0.15 \times 10^{-2}$ to $25 \times 10^{-1}$.

x indicates the case where the values exceed $25 \times 10^{-2}$ mm$^{-1}$.

(5) Duplicativity Relative to Mold

The powdery composition is baked in the same manner as in the above paragraph (4) onto a flat plate mold (250×250×9 mm) having a complicated design applied thereonto, to form a resin coating, and to what faithful extent the resulting resin coating could duplicate the design of the mold was observed by the naked eye. The results were evaluated according to the following four stages:

⊙ indicates "good".
○ indicates "somewhat good".
Δ indicates "somewhat inferior".
x indicates "far inferior".

(6) Antistatic Properties

The powdery composition (20 g) was sealed in a polyethylene bag (50×100 mm), followed by vigorously shaking the bag. As a result, particles liable to be charged or those having a strong adhesion adhered to the inner surface of the polyethylene bag. The state was observed by the naked eye and evaluated based on the following four stages:

⊙ indicates "good".
○ indicates "somewhat good".
Δ indicates "somewhat inferior".
x indicates "far inferior".

(7) Measurements of Angle of Repose and Dropping Speed After One Month

The powdery composition was allowed to stand for one month after its production, and its angle of repose after one month was measured in the same manner as in the above paragraph (1) and the dropping speed after one month, in the same manner as in the above paragraph (2).

(8) Particle Size Distribution

The respective samples to be measured (10 g) were introduced into a sieve-shaking machine manufactured by Iida Seisakusho Company and provided with 6 kinds of sieves of 350 μm, 210 μm, 177 μm, 149 μm, 105 μm and 74 μm in nominal size, followed by shaking them for 10 minutes and calculating the percentage by weight of resins having passed through the respective sieves to measure the particle size distribution.

(9) Average Particle Size

The particle size in which 50% by weight of the sample is passed through the sieves is referred to as the average particle size D 50.00.

(10) Geometrical Standard Deviation ($\sigma 1$)

The particle size in which 84.13% by weight of the sample is passed through the sieves is referred to as D 84.13. A value obtained by dividing D 84.13 by D 50.00 is referred to as a geometrical standard deviation value is ($\sigma 1$). The closer this value to 1.00, the sharper the distribution, while the more deviated the value is from 1.00, the broader the distribution. Namely, the deviation value is a value expressing the distribution state on the side where the particle diameter is larger than the average particle diameter.

(11) Geometrical Standard Deviation ($\sigma 2$)

The particle size in which 15.87% by weight of the sample is passed through the sieves is referred to as D 15.87 and a value obtained by dividing this D 15.87 by D 50.00 was rendered as a geometrical deviation value ($\sigma 2$). The closer this value to 1.00, the sharper the distribution, while the more deviated the value is from 1.00, the broader the distribution. Namely, the value is a value expressing the distribution state where the particle diameter is smaller than the average particle size.

(12) $(\sigma 1)-(\nu 2)$

This value expresses the distribution state of the sample as a whole. The closer this numeral value is to 0.0, the sharper the distribution, while the larger the value is, the broader the distribution.

Examples 1 to 8 and Comparative Example 1

A powdery vinyl chloride resin (vinyl chloride homopolymer; a suspension-polymerized product) having powder properties indicated in Table 2 described later and an average polymerization degree of 800 (3 Kg), a Ba-Zn-based stabilizer (150 g), an epoxidized soybean oil (150 g), admixed phthalate plasticizer prepared from alcohols of carbon numbers 9, 10 and 11 and phthalic anhydride (2,250 g) and a black pigment (60 g) were introduced into a 20 l capacity mixer provided with a gas-inlet port and a gas-discharging port as shown in FIG. 1, followed by heating the contents inside the mixer to 120° C. with stirring at 1,000 rpm while blowing air therein as described in Table 1 and thereafter mixing them with stirring for 10 minutes while keeping the temperature at 115° to 120° C. (a first stage). Thereafter the contents were cooled down to 50° C. or lower with stirring (a second stage). At that time, air was blown therein as described in Table 1 mentioned later except for Example 6, followed by adding an emulsion polymer having an average polymerization degree of 1,000 and an average particle size of 1.3 μm (360 g), and then mixing these with stirring for 5 minutes to coat the surface of the powder vinyl chloride resin particles with the emulsion polymer (a third stage). At that time, air was blown therein as described in Table 1, mentioned later except for Examples 7 and 8. Thereafter the contents in the mixer were taken out to obtain a powdery PVC composition.

Further, Comparative example 1 was carried out in the same manner as in Examples 1 to 8 except that no air was blown therein at any of the first, second and third stages to obtain a powdery PVC composition With the powdery PVC compositions obtained in the above Examples and Comparative example, their powder characteristics and powder moldabilities were measured. The results are shown in Table 2.

TABLE 1

| | Mixing conditions | | | | | | | | | | |
|---|---|---|---|---|---|---|---|---|---|---|---|
| | (First stage) | | | | (Second stage) | | | | (Third stage) | | |
| Experiment No. | Air blowing | Air source press. kg/cm²g | Air Rate nl/min. | Time required (min.) | Air blowing | Air source press. kg/cm²g | Air Rate nl/min. | Time required (min.) | Air blowing | Air source press. kg/cm²g | Air Rate nl/min. |
| Example 1 | Yes | 3.0 | 130 | 18 | Yes | 10.0 | 240 | 15 | Yes | 2.0 | 105 |
| Example 2 | Yes | 5.0 | 170 | 21 | Yes | 10.0 | 240 | 14 | Yes | 2.0 | 105 |
| Example 3 | No | — | — | 15 | Yes | 10.0 | 240 | 15 | Yes | 2.0 | 105 |
| Example 4 | Yes | 3.0 | 130 | 17 | Yes | 5.0 | 170 | 24 | Yes | 2.0 | 105 |
| Example 5 | Yes | 3.0 | 130 | 18 | Yes | 3.0 | 130 | 29 | Yes | 2.0 | 105 |
| Example 6 | Yes | 3.0 | 130 | 18 | No | — | — | 42 | Yes | 2.0 | 105 |
| Example 7 | Yes | 3.0 | 130 | 19 | Yes | 10.0 | 240 | 15 | No | — | — |
| Example 8 | Yes | 3.0 | 130 | 18 | No | — | — | 40 | No | — | — |
| Comp. ex. 1 | No | — | — | 15 | No | — | — | 41 | No | — | — |

TABLE 2

| Measurement items | V.C. resin | Example 1 | Example 2 | Example 3 | Example 4 | Example 5 | Example 6 | Example 7 | Example 8 | Compar. ex. 1 |
|---|---|---|---|---|---|---|---|---|---|---|
| Angle of repose (degree) | 33.0 | 35.3 | 35.5 | 36.5 | 36.2 | 36.5 | 36.9 | 35.6 | 35.9 | 38.3 |
| Dropping speed (sec/100 ml) | 11.8 | 13.5 | 13.2 | 14.6 | 14.2 | 14.5 | 15.0 | 14.0 | 14.8 | 16.4 |
| Bulk density (g/ml) | 0.505 | 0.536 | 0.539 | 0.529 | 0.531 | 0.527 | 0.522 | 0.535 | 0.528 | 0.502 |
| Coating uniformity of molded product | — | ⊚ | ⊚ | ○ | ⊚ | ○ | △ | ○ | △ | △ |
| Duplicativity relative to mold | — | ⊚ | ⊚ | ○ | ○ | ○ | ○ | ○ | ○ | △ |
| Antistatic properties | — | ○ | ○ | ○ | ○ | ○ | △ | △ | △ | △ |
| One month after allowed to stand | | | | | | | | | | |
| Angle of repose (degree) | 33.3 | 35.5 | 35.8 | 36.8 | 36.4 | 36.4 | 37.0 | 36.4 | 35.9 | 39.1 |
| Dropping speed (sec/100 ml) | 12.2 | 13.4 | 13.4 | 14.5 | 14.0 | 14.3 | 14.9 | 14.7 | 15.2 | 17.3 |
| Particle size distribution (wt %) | | | | | | | | | | |
| More than 350 μm | 0.0 | 0.0 | 0.0 | 0.0 | 0.0 | 0.0 | 0.0 | 0.0 | 0.0 | 0.5 |
| 210 μm–350 μm | 0.1 | 7.7 | 5.7 | 8.7 | 8.4 | 9.8 | 7.2 | 5.7 | 8.5 | 14.3 |
| 177 μm–210 μm | 21.8 | 11.0 | 10.0 | 14.8 | 11.2 | 14.3 | 20.2 | 14.1 | 16.6 | 15.4 |
| 149 μm–177 μm | 28.0 | 42.4 | 47.4 | 33.9 | 40.2 | 33.4 | 27.3 | 41.8 | 30.7 | 21.6 |
| 105 μm–149 μm | 43.0 | 35.4 | 34.1 | 35.0 | 36.3 | 38.1 | 36.5 | 33.5 | 35.4 | 36.0 |
| 74 μm–105 μm | 5.1 | 3.0 | 2.3 | 6.4 | 3.3 | 3.9 | 7.3 | 3.7 | 7.5 | 8.7 |
| Less than 74 μm | 1.8 | 0.5 | 0.5 | 1.2 | 0.6 | 0.5 | 1.5 | 1.2 | 1.3 | 3.5 |
| Average particle size (μm) | 149 | 156 | 157 | 155 | 156 | 155 | 154 | 157 | 154 | 151 |
| Geometric standard deviation ($\sigma 1$) | 1.250 | 1.187 | 1.129 | 1.251 | 1.206 | 1.262 | 1.273 | 1.188 | 1.266 | 1.373 |
| Geometric standard deviation ($\sigma 2$) | 0.765 | 0.770 | 0.778 | 0.744 | 0.761 | 0.761 | 0.738 | 0.762 | 0.737 | 0.723 |
| ($\sigma 1$)–($\sigma 2$) | 0.485 | 0.417 | 0.351 | 0.507 | 0.439 | 0.501 | 0.535 | 0.426 | 0.529 | 0.649 |

When the production process of the present invention is employed, the resulting powdery PVC composition has a sharp particle size distribution and a powdery composition containing an extremely small quantity of fine particles is obtained. As a result, the powder flowability is notably improved as seen from its angle of repose, dropping speed, etc., and molded products obtained from this powdery PVC composition has a uniform thickness and even when a mold having a complicated shape and a pattern of fine projection and depression parts is employed, it is possible to duplicate the pattern faithfully.

In addition, the composition is durable during a long storage and improvement in the operating efficiency can be achieved.

We claim:

1. A process for producing a vinyl chloride resin composition for powder molding by mixing a vinyl chloride resin, a plasticizer and at least one vinyl chloride resin modifying additive in a mixer, which process comprises the following steps (A), (B) and (C):
   (A) feeding a powdery vinyl chloride resin, a plasticizer and at least one vinyl chloride resin modifying additive to a high-speed agitating mixer provided with agitating elements, a jacket, a gas-inlet port and a gas-outlet port and mixing these materials with stirring while heating them to 120° to 130° C.;
   (B) cooling the resulting materials in a mixer down to 70° C. or lower; and
   (C) further adding thereto a vinyl chloride emulsion polymer and mixing the resulting materials with stirring at 70° C. or lower,
   wherein a gas is blown into said mixer in either both of steps (A) and (B) or all of said steps (A), (B) and (C), while mixing the contents in said mixer with stirring and blowing a gas into said mixer from said gas-inlet and discharging said gas from said gas-outlet port, a circular motion being imparted by said agitating elements and the gas blown-in resulting in a floating motion to the contents in the mixer, and the rate of said gas blown into said mixer being in the range of 1 to 1,000 nl/min. per l of capacity of said mixer and the pressure of said gas blown thereinto being in the range of 0.005 to 2 kg/cm$^2$G per l of capacity of said mixer.

2. A process according to claim 1 wherein said gas is air or nitrogen gas.

3. A process according to claim 1 wherein said at least one vinyl chloride resin modifying additive comprises at least one member of the group consisting of heat stabilizers, pigments, coloring agents, lubricants and inorganic fillers.

4. A process according to claim 1 wherein said vinyl chloride resin, plasticizer and at least one vinyl chloride resin modifying additive are combined in a single stage.

5. A process according to claim 1 wherein gas is blown in to the mixer in step (A) and (B).

6. A process according to claim 1 wherein gas is blown into the mixer in steps (A), (B), and (C).

7. A process according to claim 1 wherein the rate of said gas blown into said mixer is in the range of 5 to 200 nl/min. per l of the capacity of said mixer and the pressure of said gas blown thereinto is in the range of 0.1 to 0.8 kg/cm$^2$G.

8. A process according to claim 1 wherein the rate of blowing said gas into said mixer is in the range of 5 to 200 nl/min. per l of capacity of said mixer and the pressure of said gas blown thereinto is in the range of 0.1 to 0.8 kg/cm$^2$G when the number of revolutions of the agitating blades is 1000 rpm and said vinyl chloride resin is introduced in said mixer in the proportions of 0.5 l per l of capacity of said mixer.

9. A process according to claim 8 wherein said gas is air or nitrogen.

10. A process according to claim 1 wherein said gas is blown downward into the mixer from the central upper part of the mixer.

11. A process according to claim 10 wherein said gas is air or nitrogen.

* * * * *

UNITED STATES PATENT AND TRADEMARK OFFICE
CERTIFICATE OF CORRECTION

PATENT NO. : 5,179,138
DATED : January 12, 1993
INVENTOR(S) : Uemura et al.

It is certified that error appears in the above-identified patent and that said Letters Patent is hereby corrected as shown below:

Claim 1, col. 9, line 36, after "gas-inlet" insert --port--.

Signed and Sealed this

Twenty-fifth Day of January, 1994

Attest:

BRUCE LEHMAN

*Attesting Officer*  *Commissioner of Patents and Trademarks*